(12) United States Patent
Bales et al.

(10) Patent No.: US 10,318,685 B2
(45) Date of Patent: Jun. 11, 2019

(54) MANAGEMENT OF PLACEMENT CONSTRAINT REGIONS IN AN ELECTRONIC DESIGN AUTOMATION (EDA) SYSTEM

(71) Applicant: Synopsys, Inc., Mountain View, CA (US)

(72) Inventors: Mark William Bales, Livermore, CA (US); David L. Peart, Round Rock, TX (US); Jeffrey Jude Loescher, Portland, OR (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/860,636

(22) Filed: Sep. 21, 2015

(65) Prior Publication Data
US 2016/0267204 A1    Sep. 15, 2016

Related U.S. Application Data

(60) Provisional application No. 62/052,933, filed on Sep. 19, 2014.

(51) Int. Cl.
*G06F 17/50* (2006.01)

(52) U.S. Cl.
CPC ........ *G06F 17/505* (2013.01); *G06F 17/5072* (2013.01)

(58) Field of Classification Search
CPC ............ G06F 17/5072; G06F 17/5045; G06F 17/5068; G06F 17/505
See application file for complete search history.

(56) References Cited

U.S. PATENT DOCUMENTS

| | | | | |
|---|---|---|---|---|
| 7,155,693 B1 * | 12/2006 | Rodman | ............. | G06F 17/5072 716/122 |
| 8,327,305 B1 * | 12/2012 | Hooi | .................... | G06F 17/5072 716/121 |
| 2010/0100861 A1 * | 4/2010 | Frederick | ............ | G06F 17/5068 716/119 |

* cited by examiner

*Primary Examiner* — Nha T Nguyen
(74) *Attorney, Agent, or Firm* — Alston & Bird LLP (57) ABSTRACT

A method of establishing regions for placing cells of an integrated circuit (IC) includes, in part, assigning a precedence value to each of a multitude of constraint regions of the IC, and forming a multitude regions each associated with one of the constraint regions. The region associated with each constraint region is formed in accordance with the precedence value of its associated constraint region and the precedence values associated with any other constraint regions overlapping the first constraint region. Each region in a subset of the constraint regions is further defined in accordance with the region's transparency/opacity attribute.

6 Claims, 5 Drawing Sheets

MANAGEMENT OF PLACEMENT CONSTRAINT REGIONS IN AN ELECTRONIC DESIGN AUTOMATION (EDA) SYSTEM

CROSS REFERENCE TO RELATED APPLICATIONS

The present application claims benefit under 35 USC 119 (e) of U.S. provisional Application No. 62/052,933, filed Sep. 19, 2014, entitled "Management Of Placement Constraint Regions In An Electronic Design Automation (EDA) System", the content of which is incorporated herein by reference in its entirety.

FIELD OF THE INVENTION

The present invention relates, to electronic design automation (EDA), and more particularly, to managing layout constraint regions during physical integrated circuit (IC) design.

BACKGROUND OF THE INVENTION

In electronic design automation (EDA), placement of objects (also referred to herein as circuits, circuit cells or cells) is generally understood to refer to the positioning of the circuit cells on a common substrate. The cells are subject to constraints specified by the user to limit their placement to certain geometric regions on the chip. For example, a constraint may dictate that a particular type of cell must be placed within a given geometric constraint region, and all remaining cells must be excluded from the constraint region.

Such constraint regions may include, for example, site rows (rows) and voltage areas (VAs). Rows define where cells of a particular site class may be placed. VAs define regions where cells of a particular voltage configuration may be placed. Other constraint regions are also used.

A current problem with both constraint regions, including rows and VAs is that they interact with other constraint regions of the same type. For example, when a VA's size is changed, adjacent VAs must be changed to ensure they do not overlap with the changed VA, thus rendering VA changes tedious and error prone.

Rows are slightly different but suffer from many of the same problems. Rows may overlap to enable a region containing cells of several different site classes. A single or a specific set of rows may occupy one region of the IC, while a different row may occupy an adjacent region of the IC. Like VAs, since a change in a row usually requires an adjustment in the adjacent rows, conventional techniques for modifying rows are tedious and error prone.

BRIEF SUMMARY OF THE INVENTION

In accordance with one embodiment, a computerized method of managing placement constraint regions in an electronic design automation (EDA) system generates a placement for an integrated circuit (IC). The method includes assigning a precedence to each of a plurality of constraint regions for the IC of a given class of placement constraint, and determining a plurality of effective regions, each effective region corresponding with one of the constraint regions. Each effective region is determined based on the constraint region corresponding therewith and on one or more occluding constraint regions, the occluding constraint regions overlap the corresponding constraint region, and the occluding constraint regions have a greater precedence than the corresponding constraint region.

A computer system, in accordance with another embodiment of the present invention, is configured to transform a netlist representation of an integrated circuit to a physical layout of the integrated circuit. The computer system includes, in part, a query region engine configured to assign a precedence value to each of a multitude of constraint regions of the IC. The query region engine is further configured to form a multitude of effective regions each associated with one of the constraint regions. At least a first effective region associated with the first constraint region is formed in accordance with a first precedence value of its associated constraint region and a second precedence value associated with a second constraint region overlapping the first constraint region.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

For the purposes of explanation, the ensuing details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Also, individual embodiments may, for example, be described as one or more processes which are depicted as flowcharts, flow diagrams, data flow diagrams, structured diagrams, or block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In accordance with embodiments of the present invention, constraint regions having a higher precedence value occlude those of having a relatively lower precedence value. The precedence value, also referred to herein as the stacking order, is used to determine a first VA by subtracting from the shape of the first VA any other VA having a precedence value higher than that of the first VA. When editing the first VA, its effective area is automatically recalculated by taking into account the amount of overlap between the first VA and any other overlapping VAs in conformity with their precedence values. Accordingly, editing VAs is performed quickly and easily while substantially reducing the likelihood of error.

The precedence values may also be applied to other constraint regions, such as rows. To achieve this, a number of two-dimensional regions each representing a sequence of rows (referred to herein as a site array (SA)), is generated to fill the shape of the constraint region. Like VAs, each SA is assigned a stacking order attribute and therefore has an effective site array region. Unlike VAs, an SA is also assigned an attribute defining whether the SA is transparent or opaque. A non-transparent or opaque SA obscures any other overlapping SA having a lower precedence. A non-transparent or opaque SA is obscured by any other non-transparent SA having a higher precedence. A transparent SA does not obscure any another SA with a lower precedence but is obscured by any other non-transparent SA having a higher precedence. In accordance with the embodiments of the present invention, the stacking orders and transparency attributes result in quick and easy creation and editing of rows, while at the same time substantially reducing the likelihood of error.

As described above, VA constraint regions and SA constraint regions are each labeled with and assigned a stacking order or precedence value. Effective regions for such constraint regions are calculated by using Boolean geometric operations to remove higher-precedence constraint regions from the lower-precedence constraint regions. Therefore, depending on the original drawn shapes for such regions, the effective constraint regions within the boundary of the IC may or may not have gaps.

Other objects or constraint regions in the physical design of the IC may also be subtracted from such constraint regions. For example, sub-blocks in a physically hierarchical design may have higher precedence than a SA or VA and, therefore, may cause certain areas to be removed from any such constraint regions that they overlap with. Hard macro cells and/or soft macro cells may also be treated in the same manner as sub-blocks.

In some embodiments, a first type of constraint region may be assigned a precedence value (also referred to herein as precedence) higher than the precedence of a second type of constraint region. For example, in some embodiments, every sub-block may have a higher precedence than every VA, regardless of the relative precedence each sub-block may have with respect to other sub-blocks, or regardless of the relative precedence each VA may have with respect to other VAs.

Figure 1:
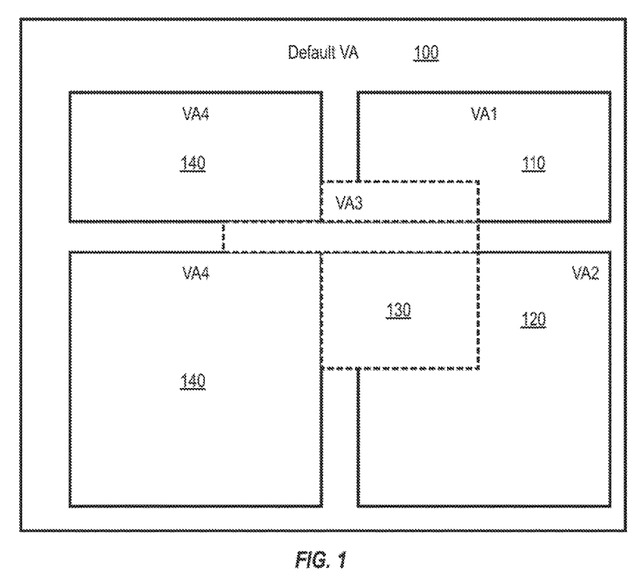
FIG. 1 is an exemplary sub-block of an integrated circuit having a multitude of voltage areas formed, in accordance with one embodiment of the present invention.

As described above, a voltage area (VA) is a constraint region having one or more geometric regions that define a physical location in which cells operating under a given voltage condition may be placed. FIG. 1 shows a set of VAs in an IC physical layout. In this example, a default VA 100 is defined for areas of the chip that have no other voltage requirements. Each of VA regions 110, 120 and 130 is shown as including a single region, whereas VA region 140 is shown as including two non-contiguous regions. Accordingly, cells associated with VA region 140 may be placed in either of the regions 140.

As is seen from FIG. 1, VA region 130 has a complex polygonal structure, VA regions 110 and 120 have a less complex but non-rectangular structures. Conventionally, each vertex of each polygon would need to be specified, a tedious and error prone task. In addition, conventionally, to change a VA (e.g., to increase its size to enable placement of more cells) would require that the user manually change not only the affected VA, but also change the surrounding VAs to prevent any overlaps or gaps.

In accordance with the present invention and as shown, for example, in FIG. 1, each VA is assigned a precedence value. For example, in FIG. 1, VA regions 110, 120, 130 and 140 are respectively assigned precedence values of 1 through 4. Accordingly, VA region 120 obscures VA region 110; VA region 130 obscures VA regions 110, 120; and VA region 140 obscures VA regions 110, 120 and 130. A computer program generating the physical layout of the IC, uses the precedence values to identify which VAs obscure which other VAs, and then uses Boolean geometric operations to compute the effective VA. In FIG. 1, each of VA regions 110, 120, 130 and 140 is assumed to have a rectangular shape. In other embodiments, the VA regions may have other shapes. As is seen from FIG. 1, each of VA regions 110 and 120 has a removed region due to its overlaps with VA region 130 which has a higher stacking order than regions 110 and 120. VA region 130, in turn, has two removed regions due to its overlap with the two regions of VA 140. In some embodiments, the computer calculates and displays the effective VA regions as a series of rectangles, as depicted in FIG. 1. In some embodiments, dashed lines are used to define the perimeters of some rectangles. For example, in FIG. 1, the perimeters of VA region 130 are shown using dashed lines. In some embodiments, the effective VA regions may be displayed as a polygon.

In some embodiments, the computer determines the effective region(s) of each VA and draws the shape(s) of the VA region. The computer then determines whether there exists any other VA region(s) with a higher precedence value (stacking order value) and overlapping one or more regions of the drawn VA. The overlapping regions are added to a Boolean mask. Any sub-blocks or hard macros that overlap the drawn VA shapes are also added to the Boolean mask. When all the overlapping shapes that will occlude a given VA have been identified and added to the Boolean mask, they are merged together to minimize the number of shapes. The mask is then inverted and used in an AND mask Boolean operation with a second mask containing the drawn shape(s) for the VA for which the effective VA is being calculated. The shapes resulting from the Boolean operation are the effective shapes for the VA and are cached along with the VA data for later use.

To achieve further efficiency, in some embodiments, the effective VA shapes are calculated only when required. For example, if a VA is modified, its effective shapes may be removed and it may be marked as out of date. Likewise, if a VA is modified such that its pre-modification bounding box or its post-modification bounding box overlaps a second VA, then that second VA's effective shapes may be removed and marked as out of date.

Figure 2:
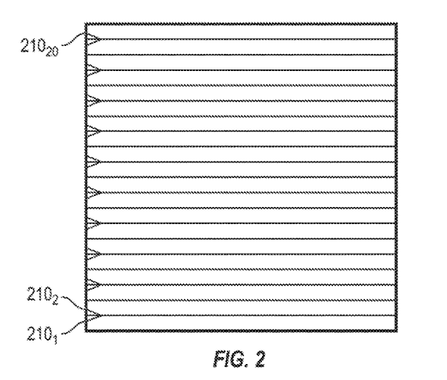
FIG. 2 shows a sequence of site rows in which a multitude of cells of the integrated circuit may be placed, in accordance with one embodiment of the present invention.

As described above, a site array (SA) is a two-dimensional object that is used to generate rows in a simple way. FIG. 2 shows a sequence of 20 rows, namely rows $210_1$, $210_2 \ldots 210_{20}$ that may be generated using a conventional technique of a sequence of 20 commands, one for each row. In accordance with embodiments of the present invention, an SA structure is generated using a single command. In some embodiments, the command provides for alternate flipping of the rows as well as generating multiples rows at the same time. By assigning stacking orders to SAs in the same manner as described above in reference to VAs, complex row structures may be generated efficiently and quickly, in accordance with embodiments of the present invention.

In some embodiments, the stacking order of a VA may only be relevant and used when compared to the stacking order of other VAs. Similarly, the stacking order of an SA may only be relevant and used when compared to the stacking order of other SAs. Also, the computed effective regions of an SA may be affected by other levels of physical hierarchy, as described above with respect to VAs.

An SA may be further defined as being either transparent or opaque. A transparent SA and the row generated from its effective shapes do not occlude or hide other SAs that have a lower stacking order. This is advantageous since rows may overlap each other and concurrently occupy a single region.

In some embodiments, the transparency of and SA is determined relative to that of other SAs. For example, a first SA may be transparent with respect to a second SA so as not to occlude the second SA, as described above. However, the first SA may be opaque with respect to a third SA so as to occlude the third SA.

Figure 3:
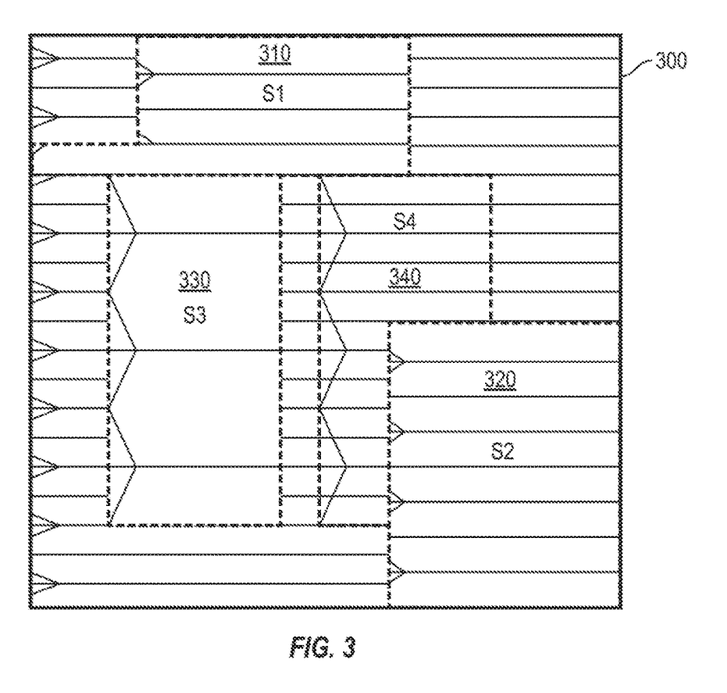
FIG. 3 is an exemplary sub-block of an integrated circuit having a multitude of site arrays formed, in accordance with one embodiment of the present invention.

FIG. 3 is an exemplary physical sub-block 300 of an IC that includes, in part, a multitude of SAs 310, 320, 330 and 340 assumed to have precedence values (staking orders) of 1, 4, 2, and 3 respectively. A default SA, like a default VA, may be assigned the lowest possible precedence. An SA with a default precedence value of 1 may be obscured by any other SA. In the example shown in FIG. 3, SAs 310, 320 and 330 are assumed to be opaque, and SA 340 is assumed to be transparent.

As is seen from FIG. 3, SAs 330 and 340 are shown as having identical underlying row characteristics and thus occupy the same number of rows. However, because SA 330 is opaque, SA 330 occludes the sections of the underlying rows that it overlaps with. The underlying rows so occluded may thus only be used for placement of cells associated with SA 330. Since SA 340 is transparent, SA 340 does not occlude the sections of the underlying rows that it overlaps with and therefore such rows may be used for placement of cells that are not associated with SA 340. In other words, cells conforming either with the row characteristics of the default SA 300 or with the row characteristics of SA 340 may be placed in the constraint region defined by SA 340. However, only cells conforming with the row characteristics of SA 330 may be placed in the constraint region defined by SA 330. It is understood that if SA 340 had a higher precedence than SA 320, since SA 340 is transparent, SA 340 would not occlude 320, and since SA 320's precedence value is lower than that of SA 340, SA 320 would not occlude SA 340, and therefore, their overlapping region may be used for placement of cells associated with both SA 320 and SA 340.

Because SA 320 has a precedence value of 4, which is higher than SA 340's precedence value of 3, SA 320 obscures the regions of both SA 340 and the default SA 300 with which it overlaps. Accordingly, only cells which conform with the row characteristics of SA 320 may be placed in the constraint region defined by SA 320.

In some embodiments, a computer performs the computation to determine the effective SA for each SA. The computer then searches to locate any other SA regions that may have higher precedence values, are opaque, and that may overlap with one or more regions of the SA whose effective shape is being determined. The SA regions so located are added to a Boolean mask. Any sub-blocks or hard macros that overlap the SA drawn shapes are also added to the Boolean mask. When all the shapes are located and added to the Boolean mask, they may be merged to minimize the number of shapes. The Boolean mask is then inverted and used in an AND mask Boolean operation with a second mask containing the drawn shapes for the SA for which the effective SA is being calculated. The resulting shapes are the effective shapes for the SA and are cached along with the Site Array data for later use. This is similar to the construction of effective VAs, with the main exception being that higher-precedence arrays that are transparent do not cause removal of the areas from the SA whose effective shape is being determined.

Figure 4A:
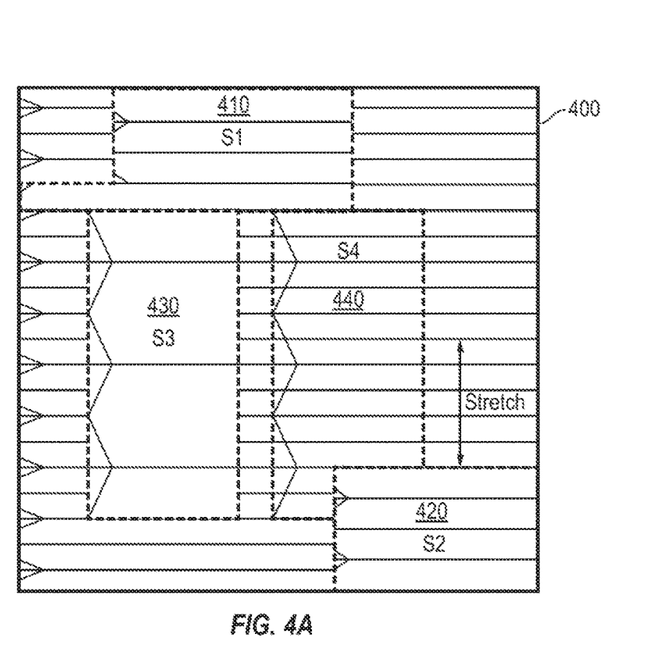
FIG. 4A is an exemplary sub-block of an integrated circuit having a multitude of site arrays formed, in accordance with one embodiment of the present invention.
Figure 4B:
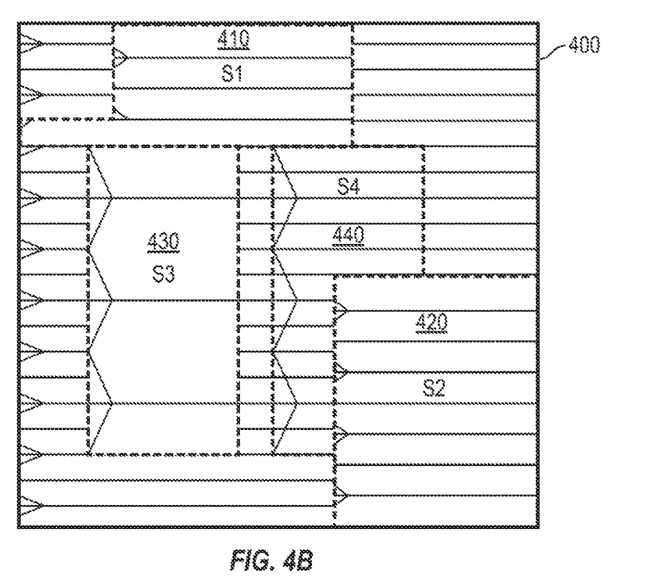
FIG. 4B shows the sub-block of the integrated circuit of FIG. 4A after stretching one of its site arrays, in accordance with one embodiment of the present invention.

Because the site rows are generated from the effective SA shapes, modifying the site rows is achieved by modifying the SA drawn shapes, and further, by changing the transparency of the SAs. FIG. 4A is an exemplary physical sub-block 400 of an IC that includes, in part, a multitude of SAs 410, 420, 430 and 440 assumed to have precedence values of 1, 4, 2, and 3 respectively. SAs 410, 420 and 430 are assumed to be opaque, and SA 440 is assumed to be transparent. Assume that it is desired to stretch SA 420 by changing its upper left and right coordinates. FIG. 4B shows physical sub-block 400 following this stretch. To achieve this, rows are automatically added to SA 420, and rows of SA 440 and the default SA 400 are automatically reduced in their lengths so as to not overlap with SA 420. The automatic modifications of SA 440 and default SA 400 occur as a result of their overlap with SA 420 and based on the precedence value and transparency characteristics of SA 420, SA 440, and default SA 400. These modifications occur in response to the modification of SA 420 and without requiring the user to identify SA 420 and default SA 400.

Conventionally, to perform this stretch, additional rows in SA 420 would need to be created manually or individually. In addition, the now-obscured portions of the default SA 400 and SA 440 would need to have their individual rows removed or modified so as not to overlap the rows from the stretched SA 420. However, in accordance with embodiments of the present invention, techniques for stretching the drawn shape of SA 420 cause the computer to recalculate the default SA 400 and SA 440 effective shapes, which in turn, causes the computer to recalculate the rows associated with the effective shapes of default SA 400, SA 420 and SA 440. Accordingly, conventional techniques are tedious and ineffective. However, as seen from this example, in accordance with embodiments of the present invention, modifications, such as stretching of an SA, is simple, effective and highly automated.

Figure 5:
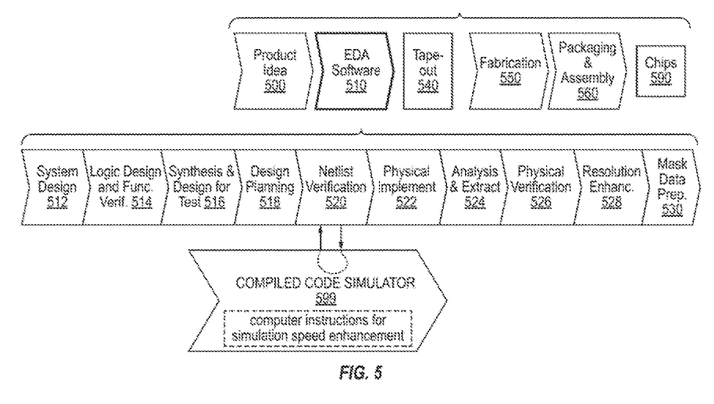
FIG. 5 shows a simplified design flow of an integrated circuit, in accordance with one embodiment of the invention.

Any appropriately programmed computer (hereinafter alternatively referred to as compiled code simulator) may automatically perform the operations discussed herein, as shown in FIG. 5. At a high level, the process of designing a chip starts with the product idea at 500 and is realized in an EDA software design process at 510. When the design is finalized, it can be taped-out at 540. After tape out, fabrication process at 550 and packaging and assembly processes at 560 occur, thereby resulting in the finished IC at 590.

The EDA software design process at 510 includes a number of stages 512-530, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC. A brief description of the components of the EDA software design process (stage 510) will now be provided.

System design at 512: The circuit designers describe the functionality that they want to implement, they can perform what-if planning to refine functionality, check costs, etc. Hardware-software architecture partitioning can occur at this stage. Exemplary EDA software products from Synopsys®, Inc. that can be used at this stage include Model Architect, Saber, System Studio, and DesignWare® products.

Logic design and functional verification at 514: At this stage, the VHDL or Verilog code for modules in the system is written and the design (which may be of mixed clock domains) is checked for functional accuracy. Exemplary EDA software products from Synopsys®, Inc. that can be used at this stage include VCS, VERA, DesignWare®, Magellan, Formality, ESP and LEDA products.

Synthesis and design for test at 516: Here, the VHDL/Verilog is translated to a netlist. The netlist can be optimized for the target technology. Additionally, the design and implementation of tests to permit checking of the finished chip occurs. Exemplary EDA software products from Synopsys®, Inc. that can be used at this stage include Design Compiler®, Physical Compiler, Test Compiler, Power Compiler, FPGA Compiler, Tetramax, and DesignWare® products.

Design planning at 518: Here, an overall floorplan for the chip is constructed and analyzed for timing and top-level routing. Exemplary EDA software products from Synopsys®, Inc. that can be used at this stage include Jupiter, IC Complier II Design Planner and Floorplan Compiler products.

Netlist verification at 520: At this step, the netlist is checked for compliance with timing constraints and for correspondence with the VHDL/Verilog source code. Exemplary EDA software products from Synopsys®, Inc. that can be used at this stage include VCS, VERA, Formality and PrimeTime products.

Note that a compiled code simulator 599 can be used during 520. If the displayed results are not satisfactory, a chip designer may go back to 516 to make changes to the IC design.

Physical implementation 522: The placement (positioning of circuit elements, such as the above-described sequential cells and combinational cells) and routing (connection of the same) occurs at this step. Exemplary EDA software products from Synopsys®, Inc. that can be used at this stage include the Astro, IC Compiler and IC Compiler II products. Although circuitry and portions thereof (such as rectangles) may be thought of at this stage as if they exist in the real world, it is to be understood that at this stage only a layout exists in a computer. The actual circuitry in the real world is created after this stage as discussed below.

Analysis and extraction at 524: At this step, the circuit function is verified at a transistor level, this in turn permits what-if refinement. Exemplary EDA software products 15 from Synopsys®, Inc. that can be used include Star RC/XT, Raphael, and Aurora products.

Physical verification at 526: At this stage various checking functions are performed to ensure correctness for: manufacturing, electrical issues, lithographic issues, and circuitry. Exemplary EDA software products from Synopsys®, Inc. that can be used at this stage include the Hercules and IC Validator products.

Resolution enhancement at 528: This involves geometric manipulations of the layout to improve manufacturability of the design. Exemplary EDA software products from Synopsys®, Inc. that can be used at this include iN-Phase, Proteus, and AFGen products.

Mask data preparation at 530: This provides the "tape-out" data for production of masks for lithographic use to produce finished chips. Exemplary EDA software products from Synopsys®, Inc. that can be used include the CATS® family of products. Actual circuitry in the real world is created after this stage, in a wafer fabrication facility (also called "fab").

Figure 6:
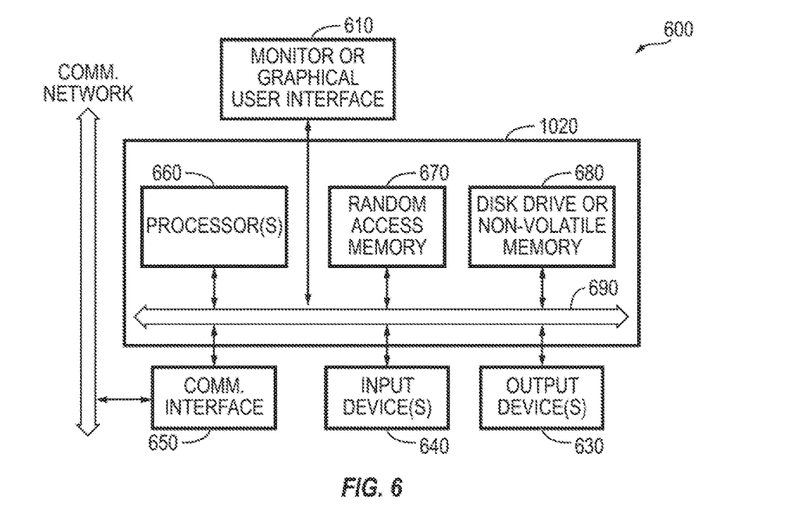
FIG. 6 is a block diagram of a computer system configured to determine and place the constrain regions of an integrated circuit, in accordance with one embodiment of the invention.

FIG. 6 is a block diagram of a computer system that may implement the features, aspects, and steps of the methods discussed herein. FIG. 6 is merely illustrative of an embodiment incorporating the present invention and does not limit the scope of the invention as recited in the claims. One of ordinary skill in the art would recognize other variations, modifications, and alternatives. In one embodiment, computer system 600 typically includes a monitor 610, a computer 620, user output devices 630, user input devices 640, communications interface 650, and the like.

As shown in FIG. 6, computer 620 may include a processor(s) 660 that communicates with a number of peripheral devices via a bus subsystem 690. These peripheral devices may include user output devices 630, user input devices 640, communications interface 650, and a storage subsystem, such as random access memory (RAM) 670 and disk drive 680.

User input devices 630 include all possible types of devices and mechanisms for inputting information to computer system 620. These may include a keyboard, a keypad, a touch screen incorporated into the display, audio input devices such as voice recognition systems, microphones, and other types of input devices. In various embodiments, user input devices 630 are typically embodied as a computer mouse, a trackball, a track pad, a joystick, wireless remote, drawing tablet, voice command system, eye tracking system, and the like. User input devices 630 typically allow a user to select objects, icons, text and the like that appear on the monitor 610 via a command such as a click of a button or the like.

User output devices 640 include all possible types of devices and mechanisms for outputting information from computer 620. These may include a display (e.g., monitor 610), non-visual displays such as audio output devices, etc.

Communications interface 650 provides an interface to other communication networks and devices. Communications interface 650 may serve as an interface for receiving data from and transmitting data to other systems. Embodiments of communications interface 650 typically include an Ethernet card, a modem (telephone, satellite, cable, ISDN), (asynchronous) digital subscriber line (DSL) unit, FireWire interface, USB interface, and the like. For example, communications interface 650 may be coupled to a computer network, to a FireWire bus, or the like. In other embodiments, communications interfaces 650 may be physically integrated on the motherboard of computer 620, and may be a software program, such as soft DSL, or the like.

In various embodiments, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like. In some embodiment, computer 620 includes one or more Xeon microprocessors from Intel as processor(s) 660. Further, one embodiment, computer 620 includes a UNIX-based operating system.

RAM 670 and disk drive 680 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 670 and disk drive 680 may be configured to store the basic programming and data constructs that provide the functionality of the present invention.

The various steps of the methods described herein may be encoded in computer instructions, such as software code modules, stored in a non-transitory computer memory. A processor of a computer system may execute the instructions in order to cause the computer system to perform the method. Software code modules and instructions that provide the functionality of the present invention may be stored, for example, in RAM 670 and disk drive 680. These software modules may be executed by processor(s) 660. RAM 670 and disk drive 680 may also provide a repository for storing data used in accordance with the present invention.

RAM 670 and disk drive 680 may include a number of memories including a main random access memory (RAM) for storage of instructions and data during program execution and a read only memory (ROM) in which fixed non-transitory instructions are stored. RAM 670 and disk drive 680 may include a file storage subsystem providing persistent (non-volatile) storage for program and data files. RAM 670 and disk drive 680 may also include removable storage systems, such as removable flash memory.

Bus subsystem 690 provides a mechanism for letting the various components and subsystems of computer 620 communicate with each other as intended. Although bus subsystem 690 is shown schematically as a single bus, alternative embodiments of the bus subsystem may utilize multiple busses.

FIG. 6 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 7:
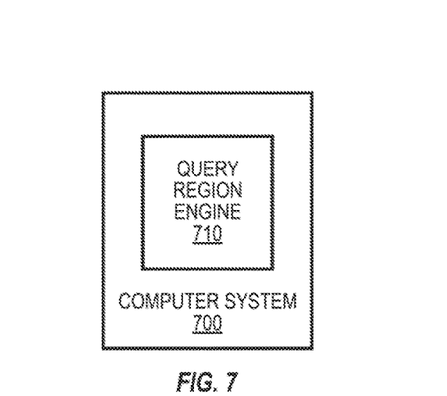
FIG. 7 is a computer system having disposed therein a region-query engine, in accordance with one embodiment of the present invention.

FIG. 7 is a computer system 700 having a query region engine 710 configured to perform many of the operations described above. For example, in one embodiment query region engine 710 is configured to assign a precedence value and transparency attributed to each of the constraint regions. Query region engine 710 is further configured to form an effective regions each associated with each of the constraint regions in accordance with their precedence values, as described above. Query region engine 710 is further configured to form an effective regions each associated with each of the constraint regions in accordance with their precedence values as well as their transparency/opacity attributes, as described above.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although the invention is described with reference to voltage areas or site array, it is understood that the present invention is not so limited and is applicable to any other regions in an IC. Other additions, subtractions or modifications are obvious in view of the present disclosure and are intended to fall within the scope of the appended claims.

What is claimed is:

1. A computer-implemented method of transforming a netlist representation of an integrated circuit to a physical layout of the integrated circuit (IC), said physical layout comprising a plurality of site arrays defined by at least a first characteristic, the method comprising:
designating each of at least first and second constraint regions disposed over the site arrays as being either opaque or transparent, wherein an opaque constraint region is adapted to include only IC cells defined by a characteristic matching the characteristic of the opaque constraint region, and wherein a transparent constraint region is adapted to include IC cells defined by a characteristic of the transparent constraint region and/or the at least first characteristic of the site arrays, wherein at least a first subset of the plurality of site arrays is opaque and at least a second subset of the plurality of site arrays is transparent;
assigning a first precedence value to the first constraint region and a second precedence value to the second constraint region, said at least first and second constraint regions partially overlapping to form an overlap region, wherein when both the first and second constraint regions are designated as being transparent, the overlap region is adapted to include IC cells defined by a characteristic matching the characteristic of the first constraint region when the first precedence value is greater than the second precedence value; and
generating the layout of the integrated circuit in accordance with the designated constraint regions.

2. The method of claim 1 wherein said first, and second constraint regions are voltage constraint regions.

3. A computer-implemented method of transforming a netlist representation of an integrated circuit to a physical layout of the integrated circuit (IC), said physical layout comprising a plurality of site arrays defined by at least a first characteristic, the method comprising:
designating each of at least first and second constraint regions disposed over the site arrays as being either opaque or transparent, wherein an opaque constraint region is adapted to include only IC cells defined by a characteristic matching the characteristic of the opaque constraint region, and wherein a transparent constraint region is adapted to include IC cells defined by a characteristic of the transparent constraint region and/or the at least first characteristic of the site arrays, wherein at least a first subset of the plurality of site arrays is opaque and at least a second subset of the plurality of site arrays is transparent;
assigning a first precedence value to the first constraint region and a second precedence value to the second constraint region, said at least first and second constraint regions partially overlapping to form an overlap region, wherein when the first constraint region is designed as opaque, and the second constraint region is designated as being transparent, and the first precedence value is smaller than the second precedence value, the overlap region is adapted to include IC cells having characteristics matching the characteristic of the first constraint region and/or the second constraint region; and
generating the layout of the integrated circuit in accordance with the designated constraint regions.

4. A computer system configured to transform a netlist representation of an integrated circuit to a physical layout of the integrated circuit (IC), said physical layout comprising a plurality of site arrays defined by at least a first characteristic, the computer system comprising:
a query region engine configured to designate each of at least first and second constraint regions disposed over the site arrays as being either opaque or transparent, wherein an opaque constraint region is adapted to include only IC cells defined by a characteristic matching the characteristic of the opaque constraint region, and wherein a transparent constraint region is adapted to include IC cells defined by a characteristic of the transparent constraint region and/or the characteristic of the site arrays, wherein at least a first subset of the plurality of site arrays is opaque and at least a second subset of the plurality of site arrays is transparent;
assign a first precedence value to the first constraint region and a second precedence value to the second constraint region, said at least first and second constraint regions partially overlapping to form an overlap region, wherein when both the first and second constraint regions are designated as being transparent, the overlap region is adapted to include IC cell defined by a characteristic matching the characteristic of the first constraint region when the first precedence value is greater than the second precedence value, wherein said computer system is further configured to:
generate the layout of the integrated circuit in accordance with the designated constraint regions.

5. The computer system of claim 4 wherein said first, and second constraint regions are voltage constraint regions.

6. A computer system configured to transform a netlist representation of an integrated circuit to a physical layout of the integrated circuit (IC), said physical layout comprising a plurality of site arrays defined by at least a first characteristic, the computer system comprising:
a query region engine configured to designate each of at least first and second constraint regions disposed over the site arrays as being either opaque or transparent, wherein an opaque constraint region is adapted to include only IC cells defined by a characteristic matching the characteristic of the opaque constraint region, and wherein a transparent constraint region is adapted to include IC cells defined by a characteristic of the transparent constraint region and/or the characteristic of the site arrays, wherein at least a first subset of the plurality of site arrays is opaque and at least a second subset of the plurality of site arrays is transparent;
assign a first precedence value to the first constraint region and a second precedence value to the second constraint region, said at least first and second constraint regions partially overlapping to form an overlap region, wherein when the first constraint region is designed as opaque, and the second constraint region is designated as being transparent, and the first precedence value is smaller than the second precedence value, the overlap region is adapted to include IC cells having characteristics matching the characteristic of the first constraint region and/or the second constraint region, wherein said computer system is further configured to:
generate the layout of the integrated circuit in accordance with the designated constraint regions.

* * * * *